United States Patent
Molander et al.

(10) Patent No.: US 7,234,014 B2
(45) Date of Patent: Jun. 19, 2007

(54) SEAMLESS USER INTERACTIONS FOR PORTABLE STORAGE DEVICES

(75) Inventors: Mark E. Molander, Cary, NC (US); Vincent Charles Conzola, Raleigh, NC (US); Elizabeth Hatfield, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 10/757,884

(22) Filed: Jan. 14, 2004

(65) Prior Publication Data

US 2005/0154815 A1 Jul. 14, 2005

(51) Int. Cl.
*G06F 13/00* (2006.01)
*G06F 12/00* (2006.01)

(52) U.S. Cl. .................. 710/302; 710/266; 711/115
(58) Field of Classification Search ........ 710/300–304, 710/266, 13; 711/115
See application file for complete search history.

(56) References Cited

U.S. PATENT DOCUMENTS

| | | | | |
|---|---|---|---|---|
| 3,623,064 A | * | 11/1971 | Kagan ........................ | 340/7.6 |
| 4,731,603 A | * | 3/1988 | McRae et al. ............ | 340/407.1 |
| 5,172,092 A | * | 12/1992 | Nguyen et al. ............ | 340/7.58 |
| 5,293,161 A | * | 3/1994 | MacDonald et al. ......... | 340/7.6 |
| 5,386,567 A | * | 1/1995 | Lien et al. ................... | 713/100 |
| 5,436,622 A | * | 7/1995 | Gutman et al. .............. | 340/7.6 |
| 5,579,491 A | * | 11/1996 | Jeffries et al. .............. | 710/302 |
| 5,680,579 A | * | 10/1997 | Young et al. ................ | 711/157 |
| 5,758,101 A | * | 5/1998 | Pemberton .................. | 710/302 |
| 5,818,182 A | * | 10/1998 | Viswanadham et al. .... | 318/116 |
| 5,862,349 A | | 1/1999 | Cho et al. ................... | 395/283 |
| 6,038,612 A | * | 3/2000 | Liow .............................. | 710/1 |
| 6,098,119 A | | 8/2000 | Surugucchi et al. .......... | 710/10 |

(Continued)

FOREIGN PATENT DOCUMENTS

EP 1310908 A2 * 5/2003

(Continued)

OTHER PUBLICATIONS

Cyber Snipa. Cyber Snipa Dog Tags User's Manual. http://www.cybersnipa.com/downloads/download_home.htm.*

(Continued)

*Primary Examiner*—Mark H. Rinehart
*Assistant Examiner*—Matthew Spittle
(74) *Attorney, Agent, or Firm*—Harrington & Smith, PC

(57) ABSTRACT

A portable storage device 10 includes a body 12, an actuator 16, and an indicator 18. When coupled to a host device 22, a user depressing the actuator 16 causes an interrupt message to be sent to the host device, which initiates shutdown of the portable device by removing it from a host device list of available storage media, and de-powers the portable device. The indicator then changes to signify that it is safe to remove the portable device from the host. The indicator may be visual, aural, or tactile. Preferably, the indicator uniquely identifies four states regarding the status of computer instruction exchange between the portable and host devices, including normal and inactive, normal and active, error, and ready-to-be-removed states. The latter is available only after actuating the actuator. Removal of the portable device is thereby effected by a single user action at the portable device: depressing the actuator.

20 Claims, 2 Drawing Sheets

U.S. PATENT DOCUMENTS

| | | | |
|---|---|---|---|
| 6,141,711 A * | 10/2000 | Shah et al. ................. | 710/302 |
| 6,247,079 B1 * | 6/2001 | Papa et al. ................. | 710/302 |
| 6,311,242 B1 | 10/2001 | Falkenburg et al. ........ | 710/103 |
| 6,549,969 B1 | 4/2003 | Hsu et al. ................... | 710/304 |
| 6,752,321 B1 * | 6/2004 | Leaming ..................... | 235/492 |
| 6,754,725 B1 * | 6/2004 | Wright et al. ................ | 710/8 |
| 6,795,327 B2 * | 9/2004 | Deng et al. ................... | 365/63 |
| 6,883,055 B2 * | 4/2005 | Chen et al. ................. | 710/302 |
| 6,892,263 B1 * | 5/2005 | Robertson ................... | 710/301 |
| 6,906,961 B2 * | 6/2005 | Eggleston et al. ..... | 365/185.29 |
| 6,990,545 B2 * | 1/2006 | Arimilli et al. ............. | 710/302 |
| 2002/0073340 A1 | 6/2002 | Mambakkam et al. ...... | 713/202 |
| 2002/0159304 A1 | 10/2002 | Morita et al. ............... | 365/200 |
| 2003/0023410 A1 * | 1/2003 | Roth .......................... | 702/188 |
| 2003/0110371 A1 | 6/2003 | Yang et al. ................. | 713/100 |
| 2003/0161193 A1 * | 8/2003 | Moran et al. ............... | 365/200 |
| 2005/0250536 A1 * | 11/2005 | Deng et al. ................. | 455/558 |

FOREIGN PATENT DOCUMENTS

JP             200305676        2/2000

OTHER PUBLICATIONS

HANBiT Electronics Co., LTD. STORiUM USB 1.1 Combo MP3 N Drive Portable Flash Memory Disk Drive. User's Manual. Feb. 20, 2003.*

* cited by examiner

SEAMLESS USER INTERACTIONS FOR PORTABLE STORAGE DEVICES

FIELD OF THE INVENTION

The present invention relates to portable storage devices and, more specifically, to portable storage devices having an actuator for enabling a user to initiate removal of the storage device from a host device and an indicator to inform the user when it is safe to remove the storage device from the host device.

BACKGROUND OF THE INVENTION

Personal computers have become everyday necessities for people conducting business and managing their lives, whether at the office, at home, or on the road. Many people now use more that one computer to conduct their everyday business, and individuals often do similar work on multiple computers (e.g., home, office, portable), some of which may even be publicly-accessible computers that any particular user accesses only once or infrequently (e.g., at airports, hotels, schools, libraries, and the like). People now often prepare material for a presentation on one or more computers and then store it on another computer for presentation to others at a different location.

Traditionally, users will save, backup, or copy computer files or data onto a storage device such as a diskette or CD-ROM. Certain computer program applications may be stored in a portable storage device and executed on a host device, and the program may or may not be copied and temporarily stored within the host device. More recently, portable storage devices such as pocket-sized USB (universal-serial-bus) flash memory devices (USB drives) have become increasingly popular for transferring (e.g., copying, moving, executing) files from one computer to another. When properly configured, such a portable storage device is functionally treated as an additional drive by the operating system of the host computer or host device to which the portable device is connected. The host computer then presents the portable device as an additional available storage location to the user for moving and/or copying files between drives. Such portable storage devices offer certain advantages over more dated portable storage media, such as magnetic or optical disks. They are generally small, typically approximately 1 inch by 3 inches by ½ inch (2.5 cm×7.5 cm×1.25 cm). They further provide increased speed and capacity as compared to older multi-track magnetic media such as diskettes or magnetic tapes, and are more resistant to physical breakage than optical devices such as CD-ROMs.

Portable external drives such as an external CD-ROM drive commonly used to supplement an ultra-compact laptop computer, are known but differ from portable storage devices in a fundamental way. Portable drives do not themselves include an intrinsic memory but rather read memory media such as an optical disk that is separately input by the user. The bulkiness of such portable drives and the need to carry additional storage media (especially when only one or two is typically needed when traveling) has limited consumer adoption of portable drives. In contrast, portable storage devices have an intrinsic memory and typically an intrinsic connector, so the bulkiness is reduced as well as the need for adaptor cords and additional media.

One drawback with the current methods of removing a portable storage device from a host device is that the user must manually intervene in a multi-step process before a portable device can be removed, generally requiring the user to interact with both the hardware and the operating system (OS) platform of the host device. For example, to remove a portable storage device from a host computer, the user first identifies the portable device to the host, requests permission to remove it (or commands the OS to remove it), and then awaits permission from the host device. Generally, multiple steps are required to even identify the portable device to the host computer.

The multi-step hardware/software task flow between host computer and portable storage device is additionally complicated by the in-the-background nature of how devices are typically integrated in the operating system. For example, before removing a portable storage device from a computer, a user of a Windows® based system must first locate and recognize the storage device in the OS via an abstract and small icon in the status tray or control panel on the computer screen, among other small icons representing other drives or programs. Then, the user typically follows several software dialogs before physically removing the portable storage device from the host computer. On occasion, a user might remove the portable storage device without OS permission, which can cause problems for the operating system.

For example, removing a portable storage device while the host is using a file on the portable device could cause lost data (e.g., a change was not saved) or a 'hanging' application, an operation moving a file may be interrupted leading to failure of the file moving and potential loss of data from the incompletely moved file, and an operating system of the host may not properly recover from a low power or 'sleep' state, requiring rebooting of the host computer. Where a portable device is repeatedly removed prior to the host device granting permission, power damage may occur to the portable device, its connector, and/or the connector receptacle on the host device, possibly requiring replacement of the damaged component.

An additional problem with portable storage devices that interface with a host computer via a USB or similar port is that current USB ports do not provide a physical retaining means or locking mechanism to prevent removal of the portable device before all software related transactions between the portable storage device and the host computer are complete. Older storage devices such as magnetic disks or tapes and CDs include retention means to physically prevent the user from removing the devices, enabling the OS to complete any file transfer and device/drive shutdown procedure prior to the user being allowed to remove the portable storage media or device. Whether inadvertently as where the user is unaware of computer on-screen warnings, or on purpose as where the user is unwilling to wait for permission from the host computer, the user may remove a portable device coupled to the host via a USB or similar non-locking connector prior to the host computer completing its normal shutdown tasks (e.g., transferring files, associated exchange of computer program instructions between the host computer and the portable device). The present invention is directed to streamlining the above multi-step process.

SUMMARY OF THE INVENTION

The present invention overcomes the limitations of current portable storage devices by eliminating the need for user interaction with both the hardware and the OS of a host device when removing the storage device from a host device. Furthermore, there is a positive indication on the portable device when it is safe or permissible to remove the portable storage device. As used herein, a portable storage device has a storage medium intrinsic to the device, as opposed to a commonly known external drive that reads a storage medium that itself is not an inherent part of the external drive. An intrinsic storage medium is therefore not removable from the portable device to which it is intrinsic, except perhaps under abnormal circumstances such as destructive removal, disassembly and repair, etc.

In one embodiment of the present invention is a computer program embodied on a storage medium for obtaining permission to remove a portable storage device from a host device. The storage medium may be disposed in either the host or portable device. The computer program includes computer program instructions that are initiated in response to a manual input at an actuator of a portable storage device that is coupled to a host device. Upon being so initiated, the computer program instructions cause the host device to remove from its list of currently available storage locations a computer readable storage medium that is intrinsic to the portable storage device. Preferably, the computer program instructions includes an interrupt command directing the host device to remove the portable device, which the host sees as an additional drive, from a list of available drives maintained by the host device. The interrupt command may originate from the portable device, or may originate from the host device itself but activated in response to the manual input at the portable device.

In accordance with the teachings of the present invention, a portable storage device includes a body, a connector, an intrinsic computer readable storage medium within the body (such as a flash memory), a manual actuator, and an indicator. The connector is for coupling to a host device. Actuation of the manual actuator initiates a removal sequence for enabling removal of the portable storage device from the host device, enabling referring to software enabled rather than physically enabled. Upon completion of the removal sequence, the indicator indicates to a user that the portable storage device may be safely removed from the host device, safely meaning with no adverse or expected adverse effects to any of the host computer (hardware or software) or the portable device, and no lost or corrupted data. That is, following actuation of the actuator, the indicator indicates that the host device (e.g., its operating system) permits removal of the portable storage device. The indicator preferably indicates three or four states uniquely by different illuminations.

Another aspect of the present invention includes a system for transferring a file, the file being embodied on a computer storage medium such as an electronic, magnetic or optical storage means. The system includes a host device and a portable storage device between which the stored file is transferred (the term transferring a file includes moving a file, copying a file, and executing a file that is stored on the portable device through the use of the host device, such as via the host device OS and user interface). In such a system, the host device has a host storage medium, a host operating system of computer instructions, and a receptacle for receiving a connector. Further in the system, the portable storage device includes a body, a connector for mating with the host device receptacle, an intrinsic computer readable storage medium within the body, a manual actuator and an indicator. Both the host storage medium and the intrinsic computer readable storage medium of the portable storage device may be electronic, optical, magnetic, or any other means for storing digital data such as computer files and the like, and the two storage media need not be of the same type. The indicator indicates, after actuation of the actuator, that the portable storage device may be removed from the host computer without causing loss or corruption of data. Preferably, the indicator further indicates additional states of the portable storage device and its exchange of computer instructions with the host. Preferably, the entire sequence resulting in the operating system (OS) of the host device removing the portable storage device (and the portable storage media) from its list of available storage media that the OS maintains, is initiated by the single user action of actuating the actuator. Once the indicator indicates a ready-to-be-removed state following actuation of the manual actuator (such as by changing from a powered state to a de-powered state when an operating system of the host computer completes removing the portable storage device from a list of storage media available to its operating system), it is safe to remove the portable device from the host device.

These and other aspects of the claimed invention will become more clearly apparent when the following detailed description is read in conjunction with the accompanying drawings.

DETAILED DESCRIPTION OF THE INVENTION

Figures 1, 2:
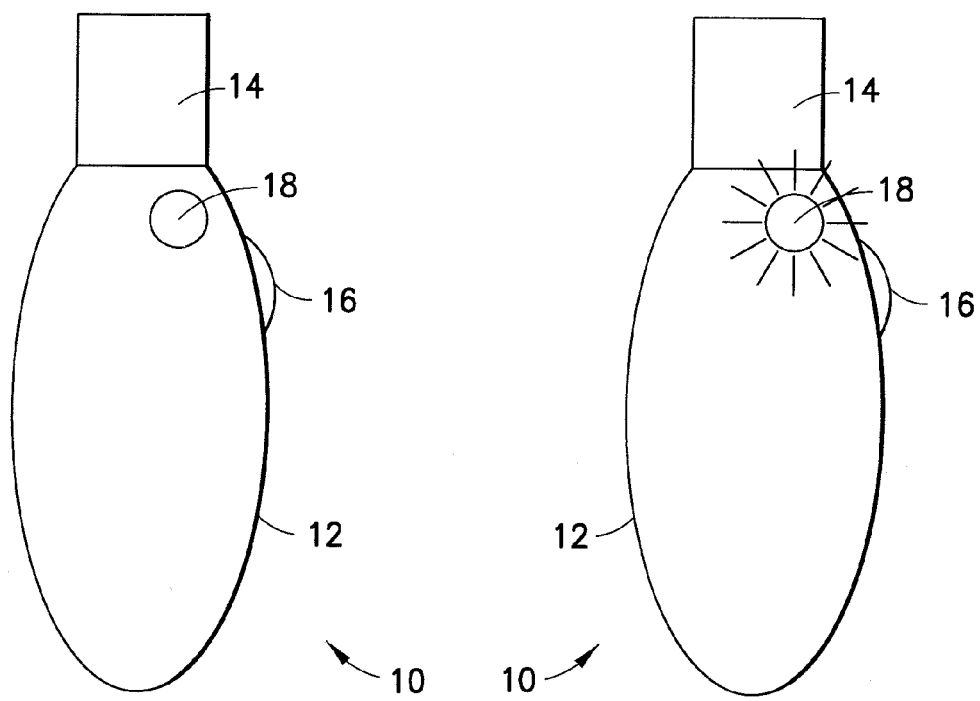
FIG. 1 is a perspective view of a portable storage device comprising an embodiment of the present invention prior to initiation of the removal sequence.
FIG. 2 is a perspective view of a portable storage device immediately after initiation of the removal process.

Referring now to the figures and to FIG. 1 in particular, there is shown a portable storage device 10 including a body 12 and a connector 14 for coupling the storage device 10 to a host device. The portable storage device is preferably a pocket-sized USB (universal-serial-bus) flash memory device. The body 12 of the portable storage device 10 is generally rectangular or elliptical in shape, but can be of any configuration that is generally simple to grasp and hold in a human hand. The connector 14 is preferably a rectangular USB connector intrinsic to the portable device and rigidly extending from the body 12, but it may be any conventional or proprietary connector for coupling the storage device 10 to a host device having a compatible receptacle. The host device is preferably a computer, but may be any device capable of transferring files including data files with an external storage device.

The portable storage device also includes an actuator or button 16 and an indicator 18. The function of the actuator 16 is described below. The indicator 18 is preferably an LED, but can be any visual, tactile or aural device that is capable of alerting a user of the status of the portable storage device 10. The indicator 18 can be used to inform the user of the current status of the portable storage device 10, such as the device is in use, is transferring files, or is in a safe mode for removal of the device. This is accomplished by providing an indicator 18 that exhibits different indications that may be sensed by a user to inform the user at least whether or not the portable device may be safely removed from the host device. As used herein, safely removed includes the instances wherein removal will not damage hardware or software in either the host computer or the portable device 10, or cause lost or corrupted data. Depending upon the particular operating system of the host device, safely removed is evidenced by the operating system granting permission to remove the portable device. The indicator 18 preferably uses a visual indication such as a change in illumination (e.g., changing color, changing from steady to blinking, changing from illuminated to not illuminated), a tactile indication (e.g., a pop-out or retracting button, a vibration), an aural indication (e.g., a specific sound), or any indication on or emanating directly from the portable device 10 that is able to be sensed by a user. One preferable color indicator scheme is the IBM® standard for hardware user touch-point colors: a blue color indicates a device 10 is not dynamically removable, and a terra cotta color indicates that it is safe to dynamically remove or unplug the device 10. Dynamically refers to the host device being powered and running, and the IBM® touch-points are not merely LEDs but a changeable color display integrated into a button or other actuator.

A tactile indication of the status of the portable storage device 10 can be achieved by providing an indicator 18 that pops out when it is safe to remove the storage device 10 which the user can feel if a finger is kept on the indicator 18 until it is safe to remove the storage device. The tactile indicator may be the actuator 16 itself or a separate tactile device, such as a "pop-up" button. Preferably, such a pop-up button would further include visual indications such as colored striations along the side of the pop-up button where a certain colored layer is exposed above the body 12 only when the button is popped up.

In an alternative embodiment of the portable storage device 10, the actuator 16 can be illuminated to also serve the function of the indicator 18. A portable device including such an illuminating actuator comprises both an actuator and indicator, though the separate functions are performed by the same component. Alternatively, multiple indicators may be employed such as light emitting diodes (LEDs) of various colors, preferably labeled, so that a user can readily ascertain whether the portable device 10 may be safely removed. The indicator 18 uniquely identifies to the user at least two and preferably four different states as detailed below, though more or less may be desirable in particular embodiments.

The portable storage device 10 preferably communicates with the OS platform of the host device via an API (application programming interface) of the particular OS. The storage device 10 preferably can be implemented for OS platforms such as Windows®, Linux, or other OS's in the art by using the relevant APIs.

When the portable storage device may be safely removed from the host device after the user actuates the actuator 16, the indicator 18 indicates a first state. Preferably, an illuminating indicator 18 informs of the first state by an extinguished LED indicator 18. When the portable storage device 10 is connected to a host device and the actuator 16 has not been depressed, the indicator 18 indicates a second state. Preferably, an illuminating indicator 18 informs of the second state by an illuminated light as depicted in FIG. 2.

In a preferred embodiment, the indicator 18 of the portable storage device 10 provides unique indications for each of four distinct states: a normal inactive state, a normal active state, an error state, and a ready-for-removal state. The normal inactive state exists when the portable device 10 is electronically coupled to the host device 22 (and preferably powered from it) and no transfer of files (e.g., moving, copying, or remote execution of computer instructions) or exchange of computer instructions is ongoing between them, and may be indicated to a user by a steadily illuminated LED. An exchange of computer files or instructions is ongoing if a series of related instructions intended to be exchanged by the internal logic of the host 22 or portable 10 device remains incomplete, regardless of momentary pauses between exchanges of individual instructions. Where various 'clean-up' instructions remain incomplete after the intended file is copied/moved/executed, the transfer is not yet complete so long as those 'clean-up' instructions are automatically executed by the host device in conjunction with the intended copying/moving/executing. Examples of a clean-up instructions include deletion of a desktop shortcut following moving a file from a host device desktop to the portable device, re-ordering a listing of files remaining in the storage medium (drive) losing the moved file, re-addressing a residual copy of a moved file to a recycle bin, and the like. Any of these may occur following moving the intended file to a new location in another device.

The normal active state exists when the portable device 10 is electronically coupled to the host device and transfer of files or exchange of computer instructions is ongoing between them. Preferably, a blinking LED indicates the normal active state. In one embodiment, a substate of the normal active state may be indicated where a file is in a locked state in the portable storage device 10 but remains open in the host device. For example, a multi-tasking user of the host device may open a document file located in the portable device (which causes a temporary copy of the document file to be made in the host device), minimize it on the host desktop, and continue working on a second file such as a graphical presentation. After a time, the user may close the second (graphical presentation) file and forget that the document file remains open. The document file in the portable device 10 remains locked but the corresponding document on the host desktop, which is possibly changed but not yet formally saved, remains open. A file-in-use substate of the normal active state may be indicated where a file, present in both devices, remains open in at least one of the devices without being acted upon by the user for a specified minimum time (e.g., for the minimum time, the file remains minimized, is not changed or scrolled, etc.). While no active transfer is occurring between the devices, a file remains open, and an indication of the file-in-use state may aid in preventing a user from misinterpreting other indications of the indicator 18. Using two indicators, the file-in-use state may be indicated simultaneously with and only in conjunction with the normal-active state.

The error state exists when the portable device 10 is electronically coupled to the host device and some malfunction has occurred, such as a failure to completely transfer a file, an inability to locate a complete requested file, a lack of sufficient available storage capacity within one of the host computer 22 or portable device 10 (depending upon direction of file transfer), and the like. The error state is preferably announced by the indicator 18 blinking at a different rate than the blink rate for the normal active state. Alternatively, a different color LED (which may be the same as or separate from another color-indicating LED), or other indication unique from the remaining three states may be used.

The ready-to-be-removed state exists after user actuation of the actuator 16 when an exchange of computer instructions between the portable 10 and host 22 devices has been completed. Depression of the actuator 16 initiates such an exchange, described below. This state is distinguished from the normal inactive state (noted above) by the user's employment of the actuator 16 prior to the indication. Preferably, the indication for the ready-to-be-removed state differs from that of the normal inactive state without regard to chronological proximity to depressing of the actuator 16. The ready-to-be-removed state is preferably indicated by an LED that is not illuminated after actuation of the button 16, or alternatively by any change in the indicator 18 following depression of the actuator 16. Extinguishing an illuminated light to indicate a ready-to-be-removed state is preferable, as many OSs currently indicate permission to remove a storage medium (e.g., a CR-ROM or a floppy diskette) by powering off the storage medium itself or its drive. However, software changes to existing OSs (which may or may not be made applicable only to the inventive portable storage device discussed herein), or a power source independent of the host computer, would enable a positive indication (versus the removal of a positive indication) to a user that it is safe to remove the portable storage device 10 form the host.

In addition to the use of an indicator 18 on the storage device 10, a visual operating system confirmation message or box can appear on the screen of the host device 22. Many UNIX-based operating systems do not have a graphical user interface and would therefore, not be capable of showing a confirmation message. In those instances, an indication provided by the portable storage device 10, whether a visual, aural or tactile indication, would be necessary to inform a user that it is safe to remove the portable storage device 10.

The invention may further include a physical retention mechanism within the connector 12 that prevents removal of the portable storage device 10 before it is safe to do so. Such a physical retention mechanism can be used in conjunction with the indicator 18 as a failsafe system to prevent potential damage to software or data within either the host computer or portable device, in the event a user does not heed the indicator 18.

Figure 3:
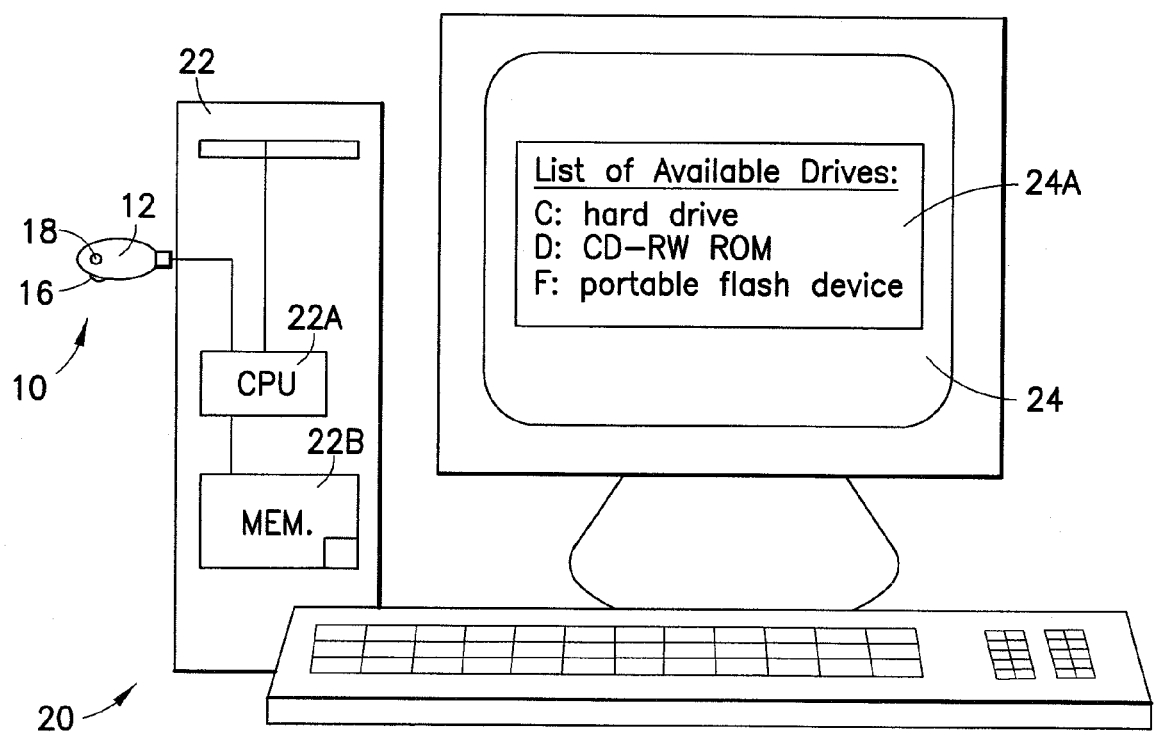
FIG. 3 is a perspective view of a portable storage device in combination with a host computer.

The above relate in general to physical aspects of the inventive portable storage device 10. Aspects of the invention that relate to the portable storage device 10 interacting with the host device 22 as an overall system 20 are now described with reference to FIG. 3. The host device 22 may be a personal computer, a digital camera, a digital musical device such as an MP3 player, a server, a mobile phone, a personal digital assistant, or any other entity having digitally stored information, a power source, and an adapter for interfacing with the connector 12 of the portable device 10. When a user depresses the actuator 16, the portable storage device 10 sends a computer instruction, preferably an interrupt message, to the host computer 22. The host computer 22, which includes a processor 22A, a memory 22B, and a display 24, receives the interrupt message or other instruction, and begins its own shutdown sequence for the portable device 10.

Recognizing that the host computer OS logically 'sees' the portable storage device 10 as a drive similar to its own internal storage media, it begins removing the portable device 10 from its file system. The particular details of this removal depend upon the particular OS, but generally include the OS ensuring no files of the portable device 10 are open, closing any files that are open, and preferably completing or alternatively aborting a file transfer that may be in progress between the host and portable devices. Preferably, any exchange of files directed by the user (via an on-screen command or a pre-programmed instruction) to be transferred between the portable 10 and host 22 devices is completed prior to the portable device 10 being removed form the file system of the host device 22. Completed exchange of computer instructions does not necessarily mean all files are transferred as requested, though that is a preferred embodiment. Specifically, certain alternative embodiments may include actuation of the button 16 to cause uncompleted transfers to abort, and to exchange further computer instructions whereby the OS removes the portable device 10 from its file system. Other actions directed by the OS may also be performed to remove the portable device from the host computer's file system. For many OSs, removing the portable device from the host's file system includes removing the portable device from a listing of available drives or storage locations to which the host computer may read files from or write files to. While such a listing 24A of available drives is shown on the display 24 of FIG. 3, the listing referred to in the claims is that maintained in the OS or host computer, whether or not displayed to a user on a computer screen 24.

The OS then disables the portable device 10, which includes disconnecting power to it. Except for non-preferred embodiments in which the portable device 10 includes an independent power source, this loss of power causes a lighted indicator 18 to extinguish (or other indicator 18 to return to a non-powered state, such as causing a pop-up button to enter a de-powered state, which may be extended or depressed). This serves as an indication on the portable storage device 10 to the user that the device 10 may be safely removed from the host computer. Preferably, the user is redundantly informed, via a display on a screen 24 of the host computer 22, that the portable device 10 may be removed (such a message being redundant to the indicator 18).

Preferably, computer instructions generated from within the portable storage device 10 initiates the redundant message displayed on the computer screen 24. Immediately prior to losing power from the host computer, the portable storage device 10 may send an instruction to the host computer to display the redundant message, which is arranged and displayed by a computer program already resident on the host computer. Alternatively, computer instructions such as a program may be downloaded onto the host computer that initiates generation of the redundant message on the computer screen based on the actions of the OS itself in disconnecting the portable device 10. Preferably, such instructions are downloaded directly from the portable device 10 itself, but may alternatively be downloaded from other sources such as a website or a computer assembler/programmer when the inventive portable device 10 becomes more ubiquitous.

Both the host 22 and portable 10 devices include storage media for storing files, data, computer instructions, and the like. Such storage media may be of a magnetic, optical, or electronic type, or combinations thereof. The storage media of the portable storage device 10 is intrinsic, that is, not normally removable from the portable device 10 as an optical disk is normally removable from a CD-R/W drive. Preferably, the storage media within the body 12 of the portable device 10 is an electronic flash media. The connector 12 is preferably a USB type connector that extends rigidly from the body, but may alternatively be other types in order to interface with host devices such as mobile phones, PDAs, MP3 digital music players, and digital cameras that may not themselves include a USB port. Such alternative connectors vary widely and are often unique to particular host device manufacturers to enable those host devices to be connected to a personal computer or testing apparatus for downloading of data stored thereon. Such data may be preferably downloaded by a retail user of the host devices onto a portable storage device of the present invention for transferring the downloaded files en masse to a newer generation host device without having to manually re-enter each file. An adapter may also be provided to mate a USB connector 12 of the inventive portable storage device 10 to one of the non-USB receptacles in the above alternative host devices.

Figure 4B:
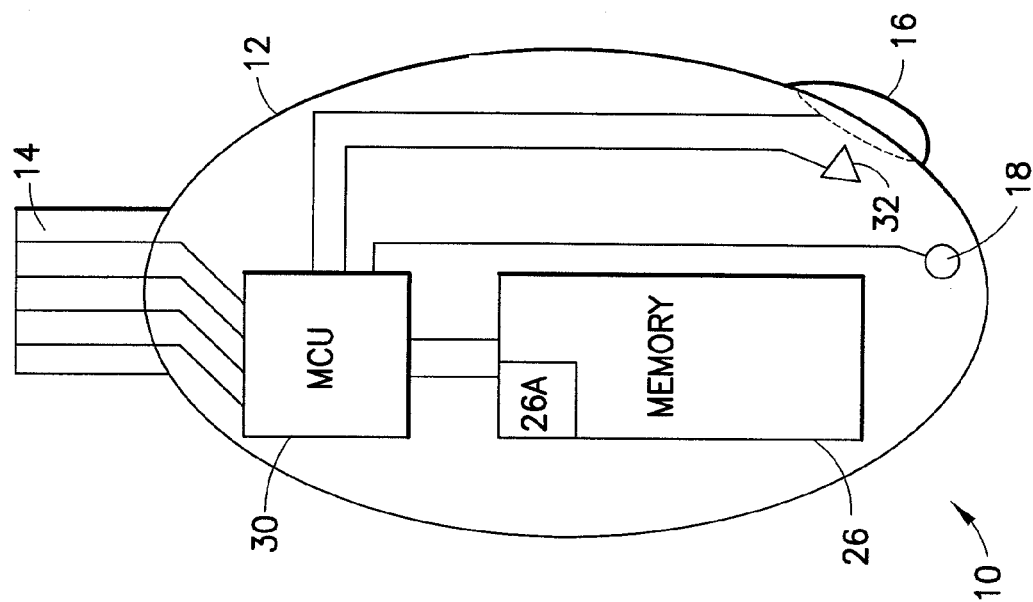
FIG. 4B is a cutaway view of a portable storage device according to a second embodiment.
Figure 4A:
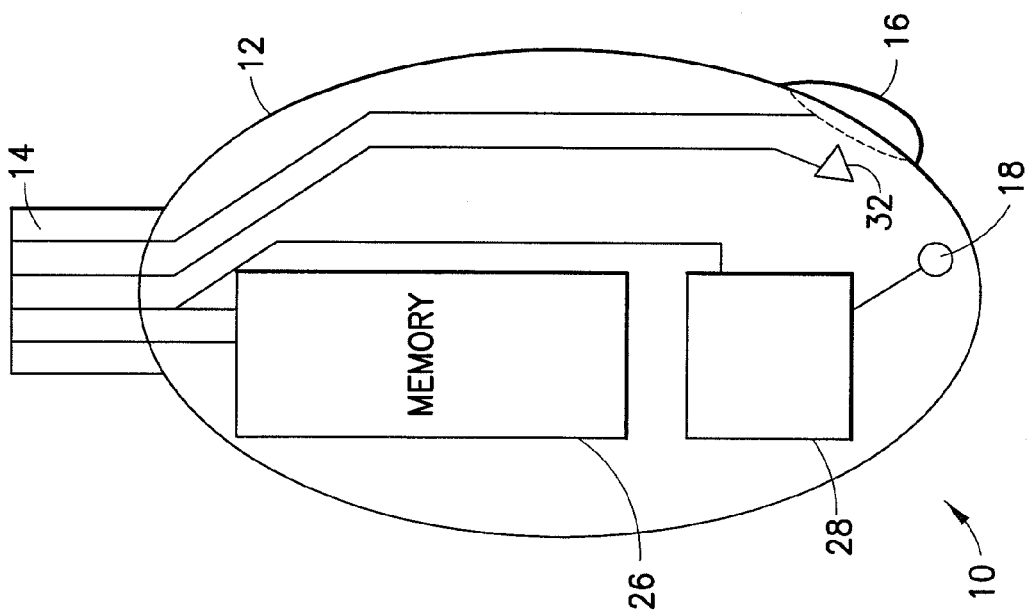
FIG. 4A is a cutaway view of a portable storage device according to a first embodiment.

FIG. 4A is a cutaway view of the portable storage device 10 having an intrinsic memory 26 and a light control unit 28 coupled to the indicator 18. Depressing the actuator 16 closes a switch 32 so that a circuit from the host device and passing through the connector 14 is closed. Alternatively, depressing the actuator 16 may cause the switch 32 that is normally closed to open the circuit. Regardless, the change in the circuit causes the host device to initiate its procedure to shut down the portable storage device 10 from its list of available storage devices, as described above. Once removed, power is disconnected from the portable storage device 10 and the lighted indicator 18 is extinguished. Where the indicator announces more than on and off states (e.g., flashing or multi-color, as above), the indicator 18 may be controlled by a light controller 28 to effect such varied states, though said light controller 28 is preferably a circuit rather than a logical processing unit.

FIG. 4B is a cutaway view of a more complex embodiment of the present invention, wherein the intrinsic memory 26 is coupled to the connector 14 via a micro controller MCU 30. Actuation of the actuator 16 closes (or opens) the switch 32, and the circuit in which the switch 32 lies is within the MCU 30 rather than in the host device. The MCU 30 then directly sends an interrupt message to the host through the connector 14. The interrupt message itself may be stored within a separate portion 26A of the memory 26 that may be a segregated from the memory available for file transfer (or a separate type of memory, such as EEPROM or EAPROM), or may be within the host device and activated by a separate computer instruction stored in the memory 26 of the portable device 10 and sent by the MCU 30. In the former instance, preferably the portable storage device 10 stores in its memory 26 a plurality of interrupt messages, each specific to a particular OS, and sends the appropriate interrupt message when the actuator 16 is depressed. Where the portable storage device 10 of FIG. 4A has no processing capability of its own and is under the command of the host device, the embodiment of FIG. 4B includes its own processor and sends as well as receives instructions to the host device.

While there has been described and illustrated a preferred embodiment of the present invention and several variations and modifications thereof, it will be apparent to those skilled in the art that further modifications and variations are possible without deviating from the broad teachings and spirit of the present invention which shall be limited solely by the scope of the claims appended hereto.

What is claimed is:

1. A portable flash memory device comprising:
    a pocket-sized body;
    an intrinsic computer readable storage medium within said body, said storage medium not normally removable from said body and storing a plurality of interrupt messages;
    a connector for removably coupling to a host device such that an operating system of the host device may logically recognize the portable storage device as additional local memory;
    a manual actuator;
    an indicator for indicating, following actuation of said actuator, that said portable flash memory device may be safely removed from a host device to which it is coupled; and
    a micro controller within said body, coupled between said actuator and said connector, responsive to an input at the manual actuator to select one message that is specific to the operating system of the host device from the plurality of interrupt messages and to send said one message to said host device.

2. A portable storage device as set forth in claim 1, wherein said indicator comprises an aural indicator for indicating as in claim 1.

3. The portable flash memory of claim 1, further comprising a power source independent of the host device.

4. The portable flash memory device of claim 1, wherein said indicator comprises a vibrating indicator for indicating as in claim 1.

5. The portable flash memory device of claim 1, wherein the indicator comprises a visual indicator integrated into the actuator for indicating as in claim 1.

6. The portable flash memory device of claim 1, wherein said indicator comprises a visual indicator that changes between blinking and steady for indicating as in claim 1.

7. The portable flash memory device of claim 1, further comprising a circuit light controller coupled between the micro controller and the indicator for effecting varied states of the indicator.

8. A system for transferring a file embodied on a computer storage medium comprising a host device and a portable flash memory device,
    said host device comprising a host storage medium, a host operating system of computer instructions that logically recognizes the portable flash memory device as additional local memory, and a receptacle for receiving a connector,
    said portable flash memory device comprising:
        a pocket-sized body;
        a connector for mating with said receptacle;
        an intrinsic computer readable storage medium within said body that is not normally removable from said body and storing a plurality of interrupt messages;
        a manual actuator for initiating computer instructions to remove said portable flash memory device from said host device;
        an indicator for indicating to a user at least that said portable flash memory device may be removed from said host device following actuation of said actuator without loss of data and without corruption of data; and
        a micro controller within said body, coupled between said actuator and said connector, responsive to an input at the manual actuator to select one message that is specific to the operating system of the host device from the plurality of interrupt messages and to send said one message to said host device.

9. A system as set forth in claim 8, wherein said indicator comprises an aural indicator for indicating as in claim 8.

10. The system of claim 8, wherein said host device comprises a digital camera.

11. The system of claim 8, wherein said host device comprises a mobile phone.

12. The system of claim 8, wherein said indicator comprises an aural indicator for indicating as in claim 8.

13. The system of claim 8, wherein said indicator comprises a tactile vibrating indicator for indicating as in claim 8.

14. The system of claim 8, wherein said indicator comprises a visual indicator that is integrated into the actuator for indicating as in claim 8.

15. The system of claim 8, wherein said indicator comprises a visual indicator that changes between blinking and steady for indicating as in claim 8.

16. The system of claim 8, wherein said indicator uniquely indicates each of four states: normal-active; normal-inactive; error; and ready-for removal.

17. The system of claim 8, wherein said portable memory device further comprises a power source independent of said host device.

18. The system of claim 8, wherein the portable storage device further comprises a circuit light controller coupled between the micro controller and the indicator for effecting varied states of the indicator.

19. The portable storage device of claim 7 wherein said varied states effected at the indicator by the light controller comprise:
   a normal inactive state whereby no transfer of computer instructions is ongoing between said portable storage device and said host device;
   a normal active state whereby a transfer of computer instructions is ongoing between said portable storage device and said host device; and
   a ready-to-be-removed state whereby, following actuation of said actuator, the portable storage device may be removed from the host device to which it is coupled without loss or corruption of data.

20. The system of claim 18, wherein said varied states effected at the indicator by the light controller comprise:
   a normal inactive state whereby no transfer of computer instructions is ongoing between said portable storage device and said host device;
   a normal active state whereby a transfer of computer instructions is ongoing between said portable storage device and said host device; and
   a ready-to-be-removed state whereby, following actuation of said actuator, the portable storage device may be removed from the host device to which it is coupled without loss or corruption of data.

* * * * *